(No Model.)
T. W. CASSIDY.
CANT HOOK.
No. 326,951. Patented Sept. 29, 1885.
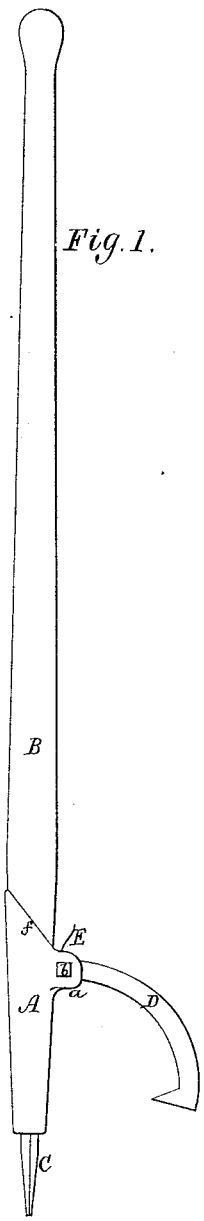
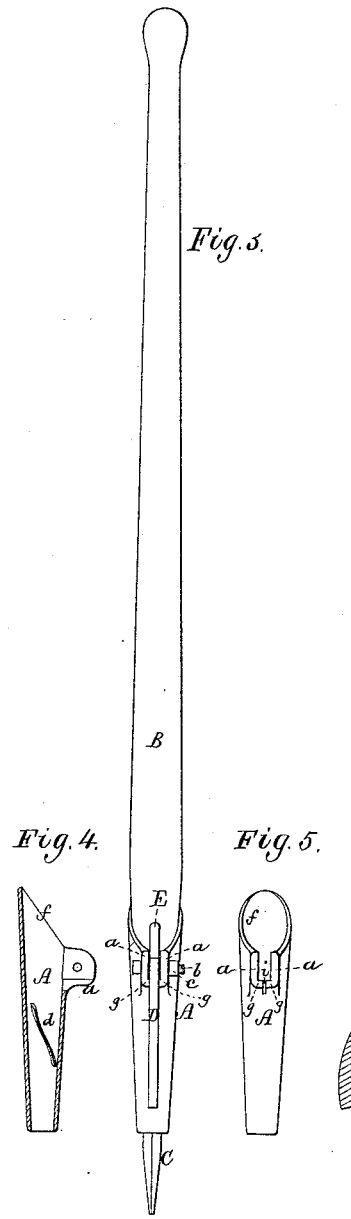
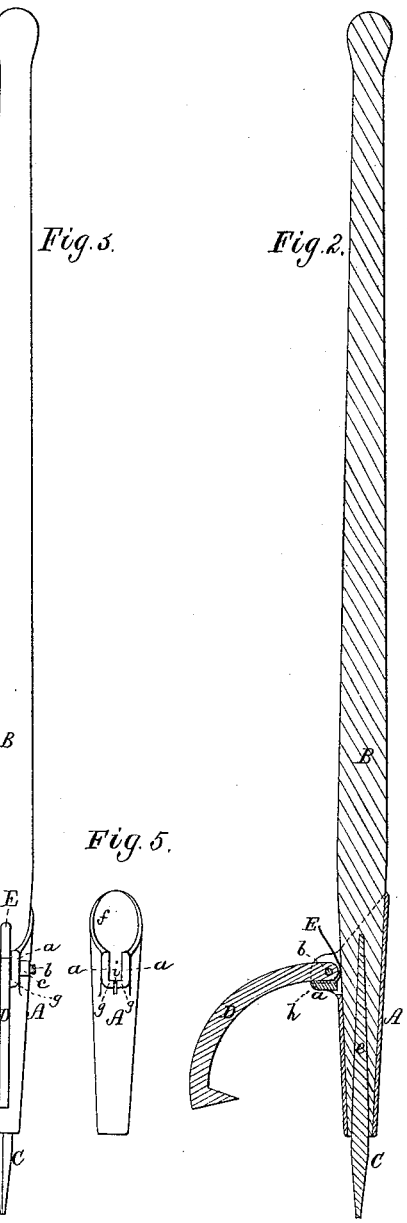
Fig. 6.
Witnesses.
S. N. Piper
Ernest B. Pratt
Inventor
Thomas W. Cassidy.
by R. H. Eddy atty.

UNITED STATES PATENT OFFICE.

THOMAS WILLIAM CASSIDY, OF BANGOR, ASSIGNOR, BY MESNE ASSIGNMENTS, TO HIMSELF, CLINTON R. JONES, AND WALTER B. SAWYER, OF PORTLAND, MAINE.

CANT-HOOK.

SPECIFICATION forming part of Letters Patent No. 326,951, dated September 29, 1885.

Application filed June 22, 1885. (No model.)

*To all whom it may concern:*

Be it known that I, THOMAS WILLIAM CASSIDY, of Bangor, in the county of Penobscot, of the State of Maine, have invented a new and useful Improvement in Cant-Hooks; and I do hereby declare the same to be described in the following specification, and represented in the accompanying drawings, of which—

Figure 1 is a side elevation, Fig. 2 a longitudinal section, and Fig. 3 an edge view, of a cant-hook containing my invention, the nature of which is defined in the claim, hereinafter presented. Fig. 4 is a longitudinal section, and Fig. 5 an edge view, of a point, handle, and hook-socket piece. Fig. 6 is a perspective view of the guard-spring E, to be hereinafter described.

In such drawings, A denotes the tubular socket-piece for supporting the handle B, the point C, and the hook D, such hook being hinged or pivoted to the socket-piece by being extended between two ears, $a\ a$, projecting from the socket-piece, and held to them by a screw-bolt, $b$, and nut $c$, the said bolt going through the ears and the nut being screwed on the bolt. The socket-piece is tapering, and has within it one or more spiral ribs, $d$, projecting from its inner surface and arranged lengthwise thereof, so that on the handle B being driven in the socket-piece such rib shall enter the handle and cause it to turn laterally, and serve thereby to hold or aid in firmly holding it within the socket-piece or from being withdrawn therefrom without at the same time revolving the handle. The point C projects from the lower end of the socket-piece, the shank $e$ of the point being driven into the handle or the part thereof within the socket-piece. Furthermore, from the ears $a\ a$ the top of the socket-piece is not in a plane at right angles to the axis of the socket-piece, but extends upward in a plane oblique thereto, as shown at $f$, such serving to afford an additional bearing or support for the handle while the cant-hook may be in use for turning over a log or piece of timber. The extension $f$ is to prevent the handle from being broken off at the top of the socket-piece when the cant-hook may be in use, as it is liable to be when the top of the socket-piece is square to the axis of such socket-piece.

Between the two ears $a\ a$, which at their lower parts turn inward toward each other, as shown at $g\ g$, there is a vibratory guard, E, formed and provided with a lip, $h$, extending down from it in manner as represented in Figs. 2 and 6. The lip extends into a narrow space, $i$, between the parts $g\ g$ of the two ears. On the hook being thrown upward toward the handle the part of the vibratory guard that intervenes between the hook and the handle will prevent the hook from being jammed into the handle. The said guard E is arranged between the handle B and the upper end of the hook D, and extends around such upper end and underneath the part of such hook—that is, between the lips. It also projects above such end in manner as represented.

In turning the hook upward to its highest position the guard E will be tipped by it and borne against the handle. By having the guard to vibrate between the ears $a$ a person having hold of the handle by both hands, with the point C in contact with the log or piece of timber, can, with his foot pressed against the upper part of the vibrator-guard, tip it so as to force upward the point of the hook D, in order to properly adjust it to the part of the log into which it may be desirable to have it enter, the guard under such circumstances operating as a lever to raise the hook.

It will be seen that the top of the socket-piece inclines upward from the ears to the opposite side of the handle in order to prevent the handle, when forced forward, from being broken at the top of the socket-piece, as it is liable to be when the top of the socket-piece is square to the axis of such socket-piece or is inclined in the opposite direction.

As most cant-hooks are used in winter as ice-picks by lumbermen, the hook is liable to be thrown back against the handle with force sufficient to seriously indent and wear it. The vibratory guard, applied as described, is to prevent such indenting and wearing of the handle, as also the hook from jamming against the parts $g\ g$ of the ears and injuring or breaking them down.

I claim—

The combination of the cant-hook having its handle and hook-supporting socket-piece provided with two ears, $a\ a$, projecting from it, and at their lower parts turned in toward each other, as set forth, with the vibratory bent lever and guard E, arranged between the ears, and extended both above and under and around the rear part of the hook D, and provided with the guiding and steadying lip $h$, projecting from it (the said guard) between the turned-in parts of the lips, all being substantially as set forth.

THOMAS WILLIAM CASSIDY.

Witnesses:
H. W. PLUMMER,
F. H. C. REYNOLDS.